(12) United States Patent
Kaliszek et al.

(10) Patent No.: US 7,369,246 B2
(45) Date of Patent: May 6, 2008

(54) METHOD FOR WINDING SENSING COILS AND SENSING COIL FOR FIBER OPTIC GYROSCOPES

(75) Inventors: Andrew W. Kaliszek, Phoenix, AZ (US); Matthew A. Olson, Glendale, AZ (US); Clarence E. Laskoskie, Scottsdale, AZ (US)

(73) Assignee: Honeywell Bnternational Inc., Morristown, NJ (US)

( * ) Notice: Subject to any disclaimer, the term of this patent is extended or adjusted under 35 U.S.C. 154(b) by 210 days.

(21) Appl. No.: 11/139,818

(22) Filed: May 27, 2005

(65) Prior Publication Data

US 2006/0268280 A1    Nov. 30, 2006

(51) Int. Cl.
*G01C 19/72* (2006.01)

(52) U.S. Cl. ..................................... 356/465

(58) Field of Classification Search ............ 385/30, 385/123, 126, 131; 356/459, 460, 465
See application file for complete search history.

(56) References Cited

U.S. PATENT DOCUMENTS

| | | | |
|---|---|---|---|
| 4,699,451 A * | 10/1987 | Mohr | 356/465 |
| 4,743,115 A | 5/1988 | Arditty et al. | |
| 4,856,900 A * | 8/1989 | Ivancevic | 356/465 |
| 5,168,539 A * | 12/1992 | Negishi et al. | 356/465 |
| 5,301,884 A * | 4/1994 | Horneman | 242/440.1 |
| 5,329,349 A * | 7/1994 | Patterson et al. | 356/73.1 |
| 5,465,150 A * | 11/1995 | Malvern | 356/465 |
| 5,475,774 A | 12/1995 | Goettsche et al. | |
| 5,657,411 A * | 8/1997 | Goettsche | 385/123 |
| 5,781,301 A * | 7/1998 | Ruffin | 356/465 |
| 5,841,932 A | 11/1998 | Page et al. | |
| 5,848,213 A * | 12/1998 | Rahn | 385/115 |
| 5,917,983 A * | 6/1999 | Page et al. | 385/134 |
| 6,211,963 B1 * | 4/2001 | Kaliszek et al. | 356/465 |
| 2002/0003936 A1 * | 1/2002 | Kaliszek | 385/123 |
| 2005/0098675 A1 | 5/2005 | Kim et al. | |

FOREIGN PATENT DOCUMENTS

| | | |
|---|---|---|
| EP | 0 624 777 A | 11/1994 |
| JP | 1 305310 A | 12/1989 |
| WO | WO 00/36441 A | 6/2000 |

OTHER PUBLICATIONS

PCT International Search Report PCT/US2006/019994, Oct. 6, 2006.

* cited by examiner

*Primary Examiner*—Samuel A. Turner (57) ABSTRACT

A sensing coil is provided for optically guiding counter-propagating light beams in a fiber optic gyroscope. The sensing coil comprises a plurality of layers of an optical fiber having a winding direction. The plurality of layers comprises inner layers, middle layers, and outer layers. The middle layers comprise first and second input ends configured to receive the counter-propagating light beams. At least one of the inner layers, middle layers, and outer layers is coupled with a different one of the inner layers, middle layers, and outer layers while maintaining the winding direction. A method is provided for winding an optical fiber, having first and second connecting ends, to form a sensing coil for a fiber optic gyroscope having a winding direction. The method comprises excluding first and second segments from a middle layer of the sensing coil to produce first and second inputs and third and fourth connecting ends respectively adjacent to the first and second inputs, and coupling each of the connecting ends with a different one of the connecting ends while maintaining the winding direction.

20 Claims, 5 Drawing Sheets

FIG. 1

THERMALLY INDUCED HOOP STRAIN IN FIBER CORE vs. COIL LAYER NUMBER

COIL LAYER NUMBER

METHOD FOR WINDING SENSING COILS AND SENSING COIL FOR FIBER OPTIC GYROSCOPES

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided by the terms of Contract No. AHW-56175 awarded by the U.S. Navy.

FIELD OF THE INVENTION

The present invention generally relates to fiber optic gyroscope systems, and more particularly relates to an optical fiber winding and method for winding optical fiber of a sensing coil in a fiber optic gyroscope system.

BACKGROUND OF THE INVENTION

Gyroscopes have been used to measure rotation rates or changes in angular velocity about an axis. A basic conventional fiber optic gyroscope (FOG) includes a light source, a beam generating device (e.g., a beam-splitter), a coil of optical fiber coupled to the beam generating device that encloses an area, and a light detector. The beam generating device transmits light beams originating from the light source into the coil of optical fiber, and these light beams propagate in a clockwise (CW) direction and a counter-clockwise (CCW) direction through along the core of the optical fiber. After propagating through the coil, the two counter-propagating (e.g., CW and CCW) beams are combined and directed to the light detector by the beam generating device. When the FOG is rotated about an axis, the CW and CCW beams experience different pathlengths while propagating through the coil, and the difference between the two pathlengths produces a phase difference between the two counter-propagating beams that is proportional to the rotational rate.

Many FOGs utilize a glass-based optical fiber to conduct light along a solid core of the fiber over long distances with low loss and distortion. This optical fiber has a glass/silica core surrounded by a plastic jacket, or buffer, and may be wound into a cylindrical structure, such as a coil, and affixed to a coil-supporting structure, such as a cylindrical hub, to form a sensing coil. The hub and fiber optic coil are both substantially cylindrical structures oriented about a center axis, and the hub has a relatively smaller radius than the radius of the fiber optic coil. An adhesive coating between the outer surface of the hub and inner surface of the fiber optic coil may be used affix the fiber optic coil to the hub.

The glass/silica core and the plastic buffer of the optical fiber may each respond differently to a variety of environmental factors and thereby adversely affect the pathlength difference between the two counter-propagating waves. The sections of fiber in the coil that are closest to the beam generating device are typically the most sensitive to environmental factors. Some of these environmental factors include temperature and mechanical strain. In this event, the output of the sensing coil yields a phase difference between the two counter-propagating waves that is indistinguishable from a rotation-induced phase difference (i.e., a bias error).

One proposed technique for minimizing this bias error is to wind the sensing coil fiber in a pattern symmetric with respect to the mid-point of the optical fiber length. A variety of winding patterns have been developed having symmetry to the mid-point of the optical fiber length. In general, these winding patterns position the mid-point of the optical fiber length at the inner radius of the cylindrical sensing coil and locate the first and second ends of the optical fiber at the outer radius of the cylindrical sensing coil. A bobbin and/or adhesive may affix the fiber wound in this pattern and leave free pigtails (e.g., a relatively short length of the first and second ends of the fiber) for routing to other components in the optical circuit (e.g., beam-splitter). Despite applying these winding patterns to sensing coils, some environments continue to produce thermally induced strains in these sensing coils that cause temperature sensitivity.

During operation, a FOG may be placed in an environment having a fluctuating ambient temperature. Temperature variations affect the sensing coil because the sensing coil undergoes mechanical strain as a result of a differential thermal expansion. A Coefficient of Thermal Expansion (CTE) mismatch between the glass/silica core and the plastic buffer may result in an axial expansion of the fiber optic coil that is significantly larger than the circumferential expansion of the fiber optic coil. Because of the non-isotropic structure of the fiber optic coil, the circumferential expansion of the fiber optic coil, constrained by the glass/silica core of the optical fiber, is significantly smaller than the axial expansion of the fiber optic coil that is dominated by the large CTE of the plastic buffer. Additionally, the glass core generally constrains circumferential expansion of the plastic buffer and forces the plastic buffer to radially expand, and the radial expansion of the plastic buffer may affect the expansion or contraction of adjacent coil layers. Further, the outer diameter of the fiber optic coil generally expands radially away from the center axis of the fiber optic coil while the inner diameter of the fiber optic coil generally expands radially toward the center axis of the fiber optic coil.

Accordingly, it is desirable to provide a winding pattern for a sensing coil in a fiber optic gyroscope that minimizes the temperature sensitivity of the sensing coil from thermally induced strains. Additionally, it is desirable to provide a method for winding a sensing coil for a fiber optic gyroscope that minimizes the temperature sensitivity of the sensing coil from thermally induced strains. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A sensing coil and methods for winding a sensing coil are provided for a fiber optic gyroscope (FOG) system. In an exemplary embodiment, a FOG sensing coil for guiding counter-propagating light beams is provided comprising a plurality of layers of an optical fiber having a winding direction. The plurality of layers comprises inner layers, middle layers, and outer layers. The middle layers comprise first and second input ends of optical fiber configured to receive the counter-propagating light beams. At least one of the inner layers, the middle layers, and the outer layers are coupled with a different one of the inner layers, the middle layers, and the outer layers while maintaining the winding direction.

In another exemplary embodiment, a method is provided for winding an optical fiber to form a FOG sensing coil having a winding direction, the optical fiber having first and second connecting ends. The method comprises excluding first and second segments of optical fiber from a middle layer of the sensing coil to produce first and second inputs and third and fourth connecting ends respectively adjacent to the first and second inputs, and coupling each of the connecting ends with a different one of the connecting ends while maintaining the winding direction.

In yet another exemplary embodiment, a FOG sensing coil for guiding counter-propagating light beams is provided comprising a plurality of substantially concentric windings of an optical fiber having a winding direction. The plurality of concentric windings comprises an inner winding, a middle winding, and an outer winding. The middle winding comprises first and second input ends configured to receive the counter-propagating light beams. At least one of the inner winding, the middle winding, and the outer winding is coupled with a different one of the inner winding, the middle winding, and the outer winding while maintaining the winding direction.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

A sensing coil and method for winding a sensing coil are provided for a fiber optic gyroscope (FOG). In general, the sensing coil comprises a plurality of layers of an optical fiber having a single winding direction and having first and second input ends configured to receive counter-propagating light beams. The plurality of layers comprises an inner layer, a middle layer, and an outer layer. The first and second input ends are located in the middle layer. At least one of the inner layer, the middle layer, and the outer layer is coupled with a different one of the inner layer, the middle layer, and the outer layer while maintaining the winding direction.

Figure 1:
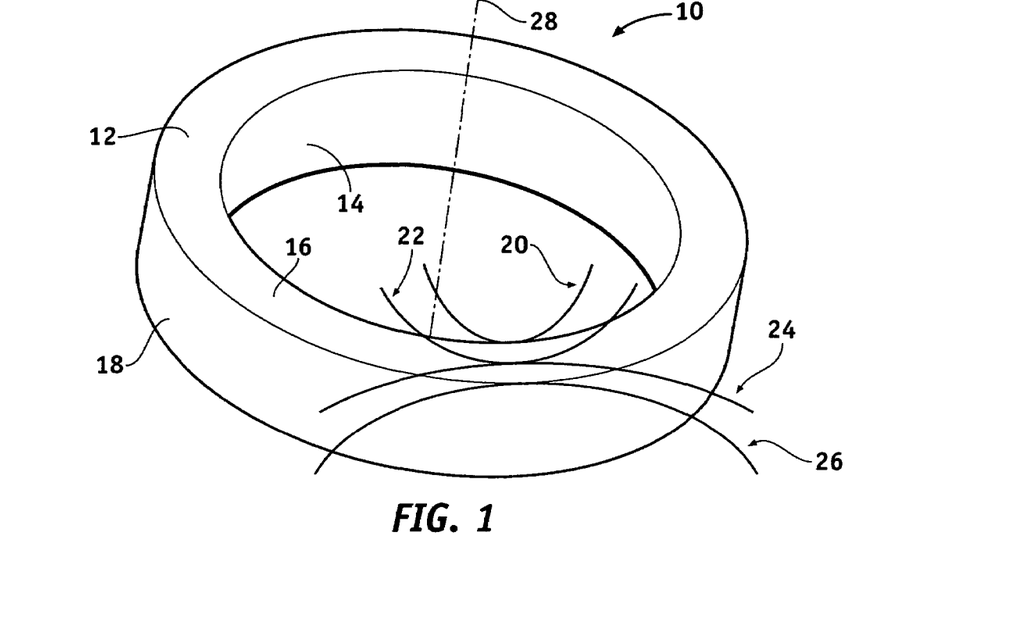
FIG. 1 is a perspective view of a sensing coil for a fiber optic gyroscope in accordance with an exemplary embodiment of the present invention.

Referring now to the drawings, FIG. 1 is a perspective view of a sensing coil 10 for a fiber optic gyroscope (FOG) in accordance with an exemplary embodiment of the present invention. The sensing coil 10 comprises first and second input ends, described in greater detail hereinafter, and a plurality of layers 12 of optical fiber windings forming a single optical path between the input ends. The input ends are configured to couple to an optical circuit of the FOG (e.g., an optical beam splitter/combiner) and thereby receive counter-propagating light beams. In an exemplary embodiment, the sensing coil 10 is substantially cylindrical, and the layers 12 of optical fiber windings are organized substantially concentric about a longitudinal axis 28 of the sensing coil 10 in a single winding direction (e.g., clockwise or counter-clockwise).

The sensing coil 10 is typically composed of an optical fiber. The optical fiber is a strand of glass having an inner core region and an outer cladding with different optical indices of refraction that form an optical waveguide. A plastic coating, or jacket, covers the outer glass to protect the optical fiber from environmental factors. In general, the optical fiber is specifically wound onto a bobbin, adhered, and cured to form the sensing coil 10 although other methods may be used to produce the sensing coil 10 from the optical fiber.

In general, the layers 12 of optical fiber windings include, but are not necessarily limited to, inner layers 14, middle layers 16, and outer layers 18 based on the location of the layer with respect to the longitudinal axis 28 of the sensing coil 10. For example, the inner layers 14 are proximally located from the longitudinal axis 28, the middle layers 16 are medially located from the longitudinal axis 28, and the outer layers 18 are distally located from the longitudinal axis 28. In a FOG, the layers 12 may be positioned about a hub that supports the sensing coil 10 and affixed to the hub with an adhesive.

Figure 2:
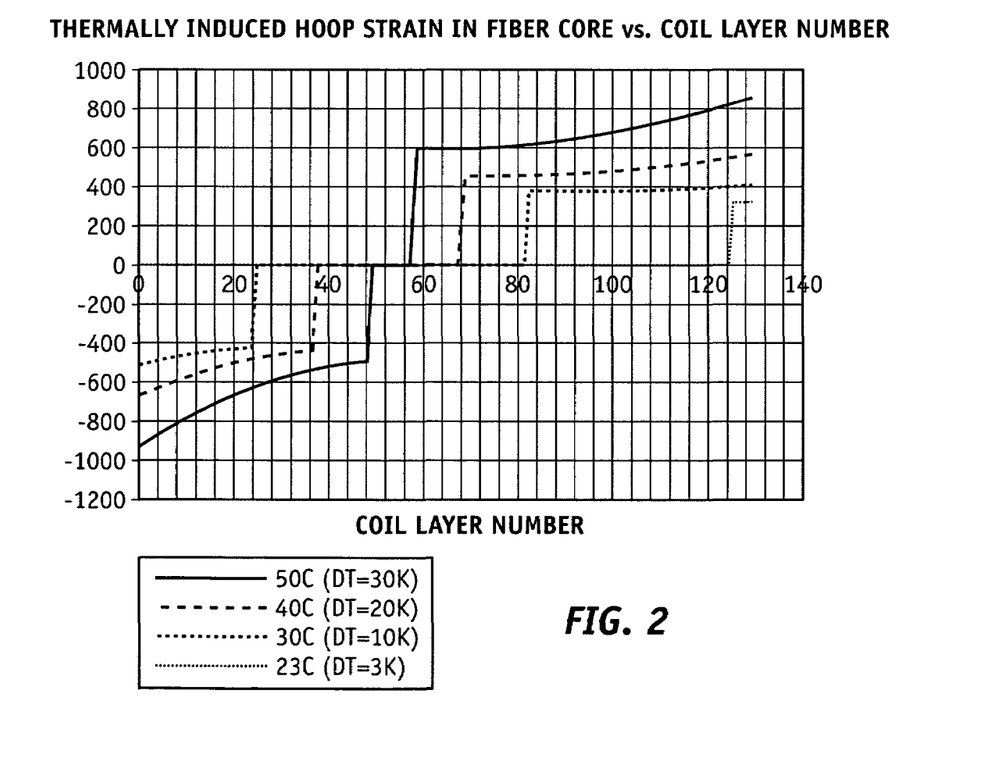
FIG. 2 is a graph illustrating hoop strain on the layers of a sensing coil.

FIG. 2 is a graph illustrating hoop strain on the layers of a sensing coil. The hoop strain on various layers of the sensing coil is shown for four different temperatures: 23° C.; 30° C.; 40° C.; and 50° C. The strain changes from negative values (e.g., associated with the compression of the optical fiber) in the inner layers of the sensing coil, through zero strain for the strain-free coil layer region about the mid-diameter of the sensing coil, to positive values (e.g., associated with the expansion of the coil fiber) in the outer coil layers. In general, the number of unrestrained coil layers decreases with increasing temperatures. In accordance with the present invention and the following exemplary embodiments of sensing coil winding patterns, bias errors may be reduced by modifying the conventional winding pattern to relocate the input ends of the sensing coil to the middle layers, where stresses are much lower, and coupling the ends from the inner and outer layers in a variety of configurations to maintain a single optical path with a single winding direction.

The sensing coil 10 shown in FIG. 1 has an unconnected configuration with optical fiber pigtails 20, 22, 24, and 26. A winding from the inner layers 14 is divided to produce a first pair of ends 20, windings from the middle layers 16 are divided to produce a second and third pair of ends 22, 24, and windings from the outer layers 18 are divided to produce a fourth pair of ends 26. In an exemplary embodiment, the inner layers 14 winding are the innermost windings of the sensing coil 10, the middle layers 16 are the mid-diameter windings of the sensing coil 10, and the outer layers 18 are the outermost windings of the sensing coil 10. Other windings from the respective layers 14, 16, 18 may be used. In some configurations of the sensing coil 10, one pair of ends from one of the layers 14, 16, 18 may remain unsegmented such that the ends of such pair remain connected to one another. For all of the configurations of the sensing coil 10, the various connections among the ends 20, 22, 24, 26 may be coupled to one another leaving a pair of ends 22, 24 as an input to the sensing coil 10 and maintaining the single winding direction of the sensing coil 10.

Figure 3:
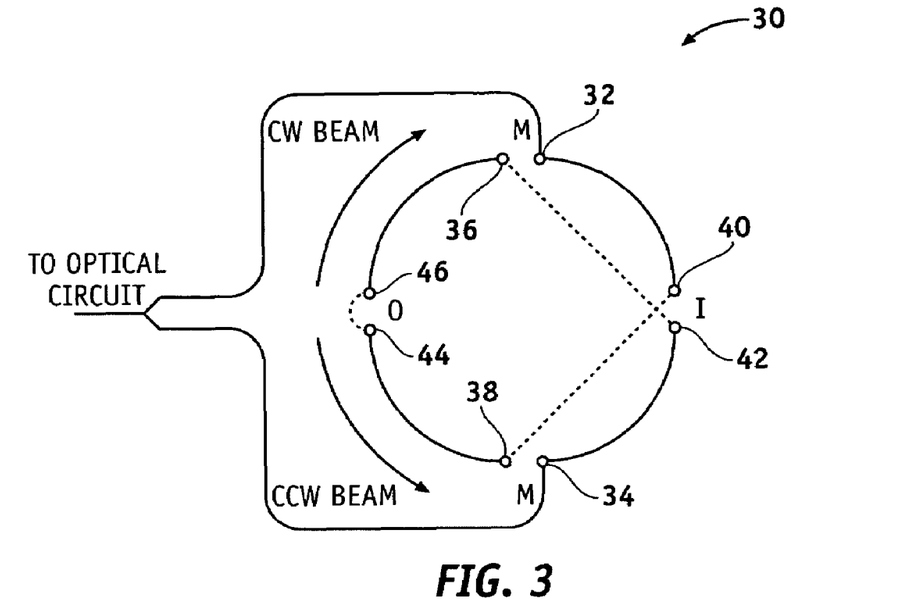
FIG. 3 is a schematic diagram of a sensing coil winding pattern in accordance with a first exemplary embodiment of the present invention.

FIG. 3 is a schematic diagram of a sensing coil 30 winding pattern in accordance with a first exemplary embodiment of the present invention. The sensing coil 30 comprises first and second input ends 32, 34 in the middle layers (M) of the sensing coil 30, first and second connecting ends 36, 38 in the middle layers (M) that are substantially adjacent to the first and second input ends 32, 34, respectively, third and fourth connecting ends 40, 42 in the inner layers (I) of the sensing coil 30, and fifth and sixth connecting ends 44, 46 in the outer layers (O). The input ends 32, 34 are configured to couple with an optical circuit of a FOG, and the connecting ends 36 and 42, 38 and 40, and 44 and 46 are configured to coupled with each other. In this first exemplary embodiment, light beams entering the sensing coil 30 at the inputs ends 32, 34 in the middle layers (M) propagate to the connecting ends 40, 42 in the inner layers (I), then to the connecting ends 38, 36 in the middle layers (M), then to the connecting ends 44, 46 in the outer layers (O), then to the connecting ends 36, 38 in the middle layers (M), then to the connecting ends 42, 40 in the inner layers (I), then to the input ends 34, 32, respectively, each of such light beams maintain the single winding direction.

Figure 4:
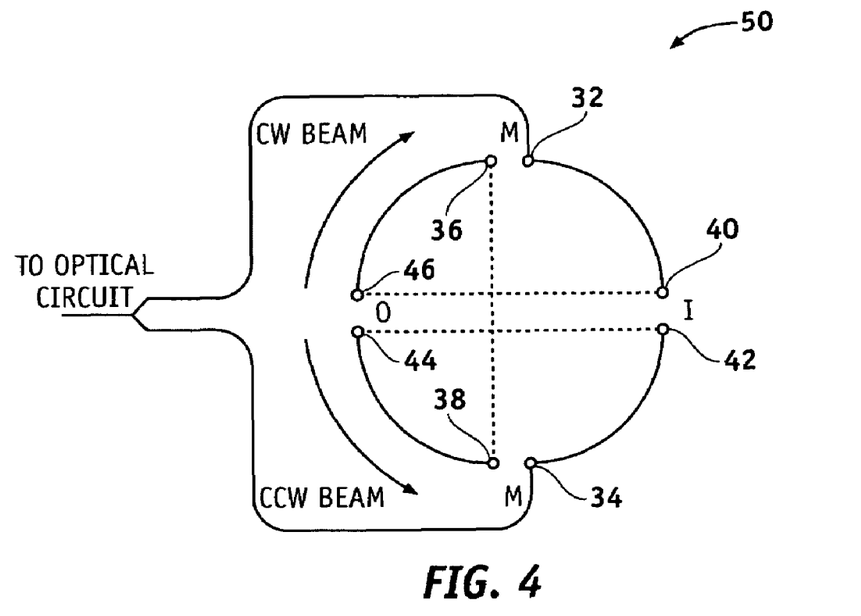
FIG. 4 is a schematic diagram of a sensing coil winding pattern in accordance with a second exemplary embodiment of the present invention.

FIG. 4 is a schematic diagram of a sensing coil 50 winding pattern in accordance with a second exemplary embodiment of the present invention. The sensing coil 50 comprises first and second input ends 32, 34 in the middle layers (M), first and second connecting ends 36, 38 in the middle layers (M) that are substantially adjacent to the first and second input ends 32, 34, third and fourth connecting ends 40, 42 in the inner layers (I), and fifth and sixth connecting ends 44, 46 in the outer layers (O) of the sensing coil 50. The input ends 32, 34 are configured to couple with an optical circuit of a FOG, and the connecting ends 40 and 46, 42 and 44, and 36 and 38 are configured to couple with each other. In this second exemplary embodiment, light beams entering the sensing coil 50 at the input ends 32, 34 in the middle layers (M) propagate to the connecting ends 40, 42 in the inner layers (I), then to the connecting ends 46, 44 in the outer layers (O), then to connecting ends 36, 38 in the middle layers (M), then to the connecting ends 44, 46 in the outer layers (O), then to the connecting ends 42, 40 in the inner layers (I), then to the input ends 34, 32, respectively, each of such light beams maintains the single winding direction.

Figure 5:
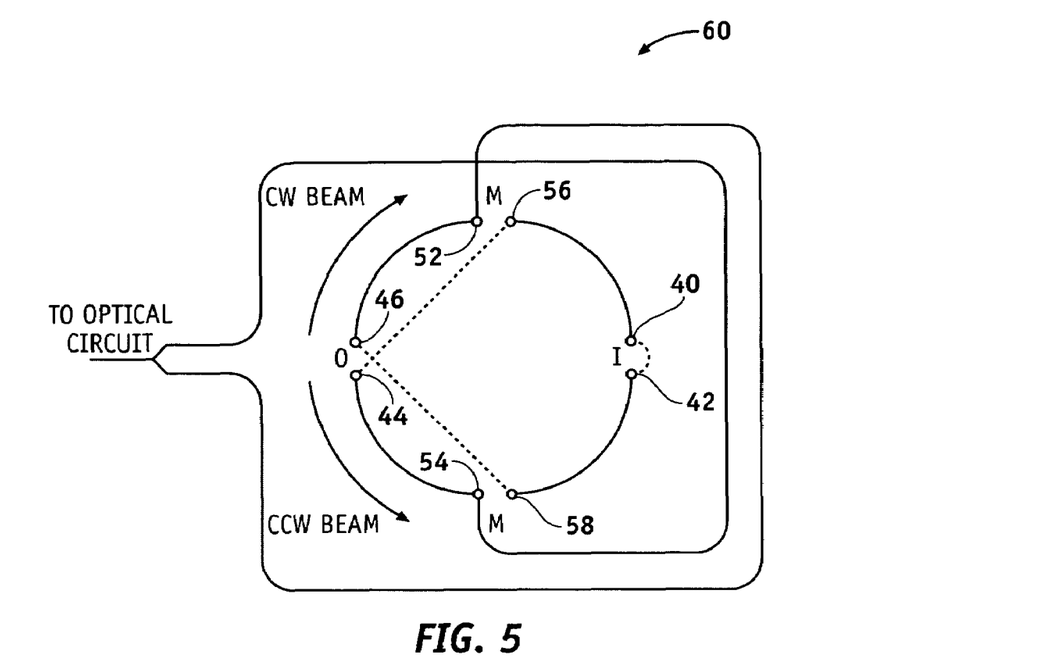
FIG. 5 is a schematic diagram of a sensing coil winding pattern in accordance with a third exemplary embodiment of the present invention.

FIG. 5 is a schematic diagram of a sensing coil 60 winding pattern in accordance with a third exemplary embodiment of the present invention. The sensing coil 60 comprises first and second input ends 52, 54 in the middle layers (M), first and second connecting ends 56, 58 in the middle layers (M) that are substantially adjacent to the first and second input ends 52, 54, respectively, and the third and fourth connecting ends 44, 46 in the outer layers (O). The first and second input ends 52, 54 are configured to couple with an optical circuit of a FOG, first connecting end 56 is coupled to the third connecting end 44, and the second connecting end 58 is coupled to the fourth connecting end 46. In this third exemplary embodiment, light beams entering the sensing coil 60 at the input ends 54, 52 in the middle layers (M) propagate to the connecting ends 44, 46 in the outer layers (O), then to the connecting ends 56, 58 in the middle layers (M), then to the connecting ends 46, 44 in the outer layers (O), then to the input ends 52, 54, respectively, each of such light beams maintains the single winding direction.

Figure 6:
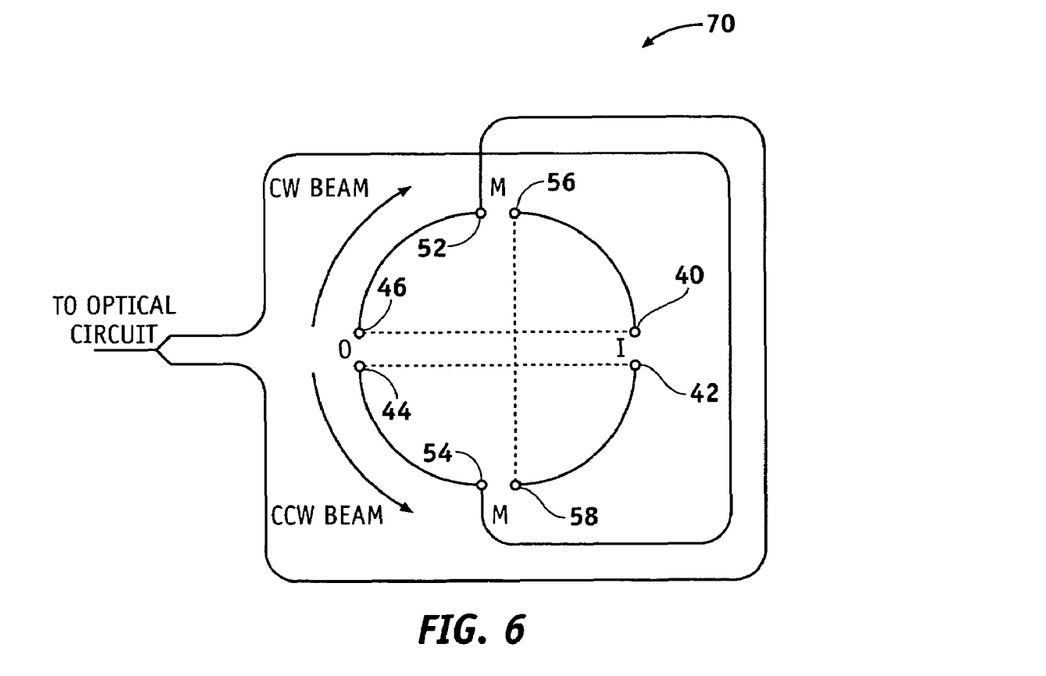
FIG. 6 is a schematic diagram of a sensing coil winding pattern in accordance with a fourth exemplary embodiment of the present invention.

FIG. 6 is a schematic diagram of a sensing coil 70 winding pattern in accordance with a fourth exemplary embodiment of the present invention. The sensing coil 70 comprises the first and second input ends 52, 54 in the middle layers (M), first and second connecting ends 56, 58 in the middle layers (M) that are substantially adjacent to the first and second input ends 52, 54, respectively, third and fourth connecting ends 40, 42 in the inner layers (I), and fifth and sixth connecting ends 44, 46 in the outer layers (O). The first connecting end 56 is coupled to the second connecting end 58, the third connecting end 40 is coupled to the sixth connecting end 46, and the fourth connecting end 42 is coupled to the fifth connecting end 44. In this third exemplary embodiment, light beams entering the sensing coil 60 at the input ends 54, 52 in the middle layers (M) propagate to the connecting ends 44, 46 in the outer layers (O), then to the connecting ends 42, 40 in the inner layers (I), then to the connecting ends 58, 56 in the middle layers (M), then to the connecting ends 40, 42 in the inner layers (I), then to the connecting ends 46, 44 in the outer layers (O), then to the input ends 52, 54, respectively, each of such light beams maintains the single winding direction.

Figure 7:
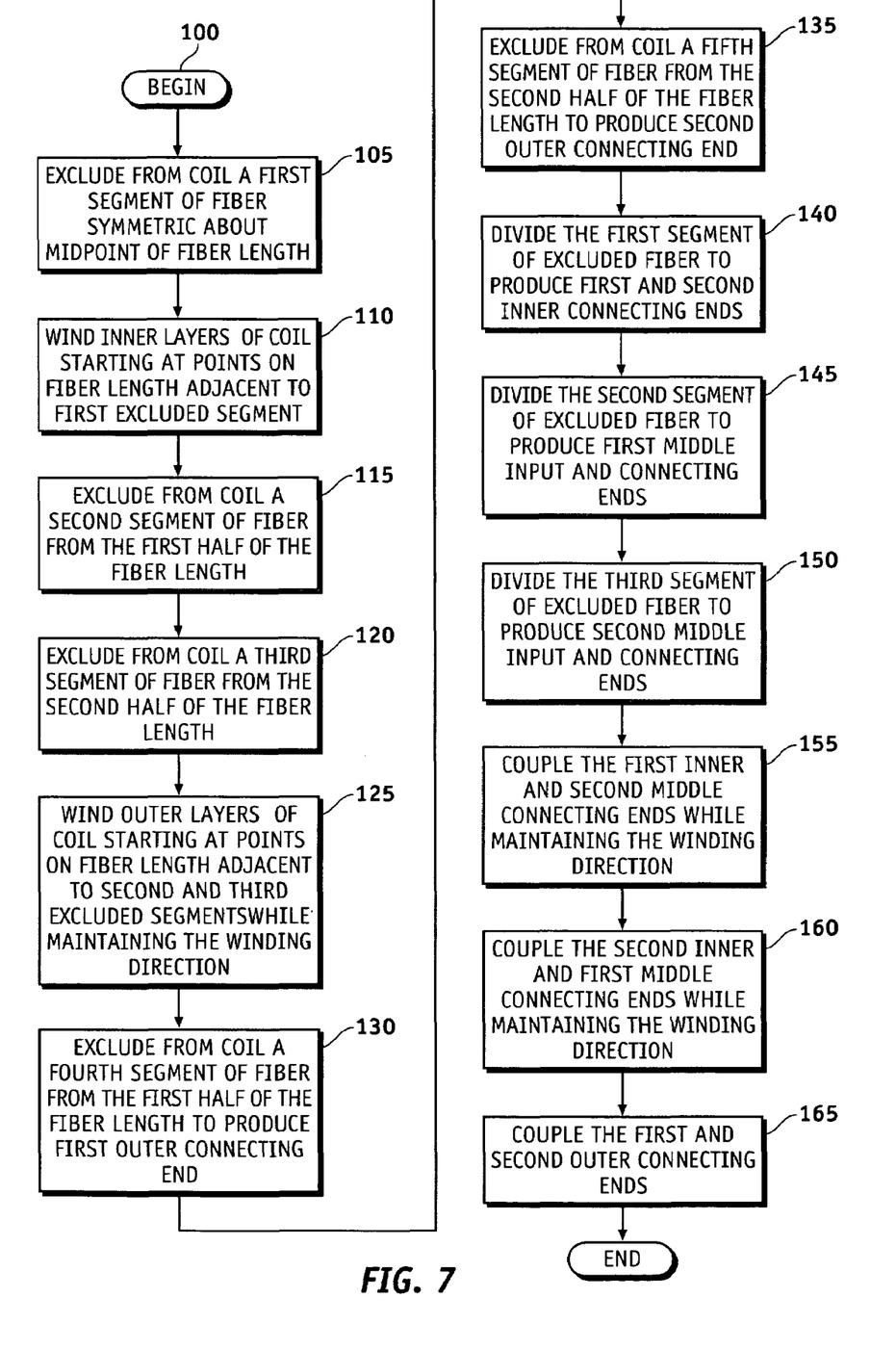
FIG. 7 is a flow diagram of a method for winding a sensing coil for a fiber optic gyroscope in accordance with an exemplary embodiment of the present invention.

FIG. 7 is a flow diagram of a method for winding a sensing coil for a fiber optic gyroscope in accordance with an exemplary embodiment of the present invention. The method begins at 100. A first segment of optical fiber is excluded from the sensing coil 10 (FIG. 1) at step 105, and preferably the first segment is symmetric about the midpoint of the fiber length. The inner layers 14 (FIG. 1) are wound beginning at points on the fiber length adjacent to the first excluded segment at step 110. A second segment of optical fiber is excluded from the sensing coil 10 (FIG. 1) at the middle layers 16 (FIG. 1) (e.g., from a first half of the fiber length) at step 115. A third segment of optical fiber is excluded from the sensing coil 10 (FIG. 1) at the middle layers 16 (FIG. 1) (e.g., from a second half of the fiber length) at step 120. The outer layers 18 (FIG. 1) of the sensing coil 10 (FIG. 1) are wound starting at points on the fiber length adjacent to the ends of the second and third excluded segments while maintaining a single winding direction at step 125. A fourth segment of optical fiber is excluded from the sensing coil 10 (FIG. 1) at the outer layers 18 (FIG. 1) (e.g., from the first half of the fiber length) to produce a first outer connecting end at step 130. A fifth segment of optical fiber is excluded from the sensing coil 10 (FIG. 1) at the outer layers 18 (FIG. 1) (e.g., from the second half of the fiber length) to produce a second outer connecting end at step 135.

The first segment of fiber at the inner layer 14 (FIG. 1) is divided to produce first and second inner connecting ends at step 140. The second segment of excluded fiber is divided to produce a first middle input and a first middle connecting end at step 145. The third segment of excluded fiber is divided to produce a second middle input and a second middle connecting end at step 150.

The first inner connecting end and the second middle connecting end are coupled while maintaining the single winding direction at step 155. The second inner connecting end and the first middle connecting end are coupled while maintaining the single winding direction at step 160. The first and second outer connecting ends are coupled together at step 165.

Figure 8:
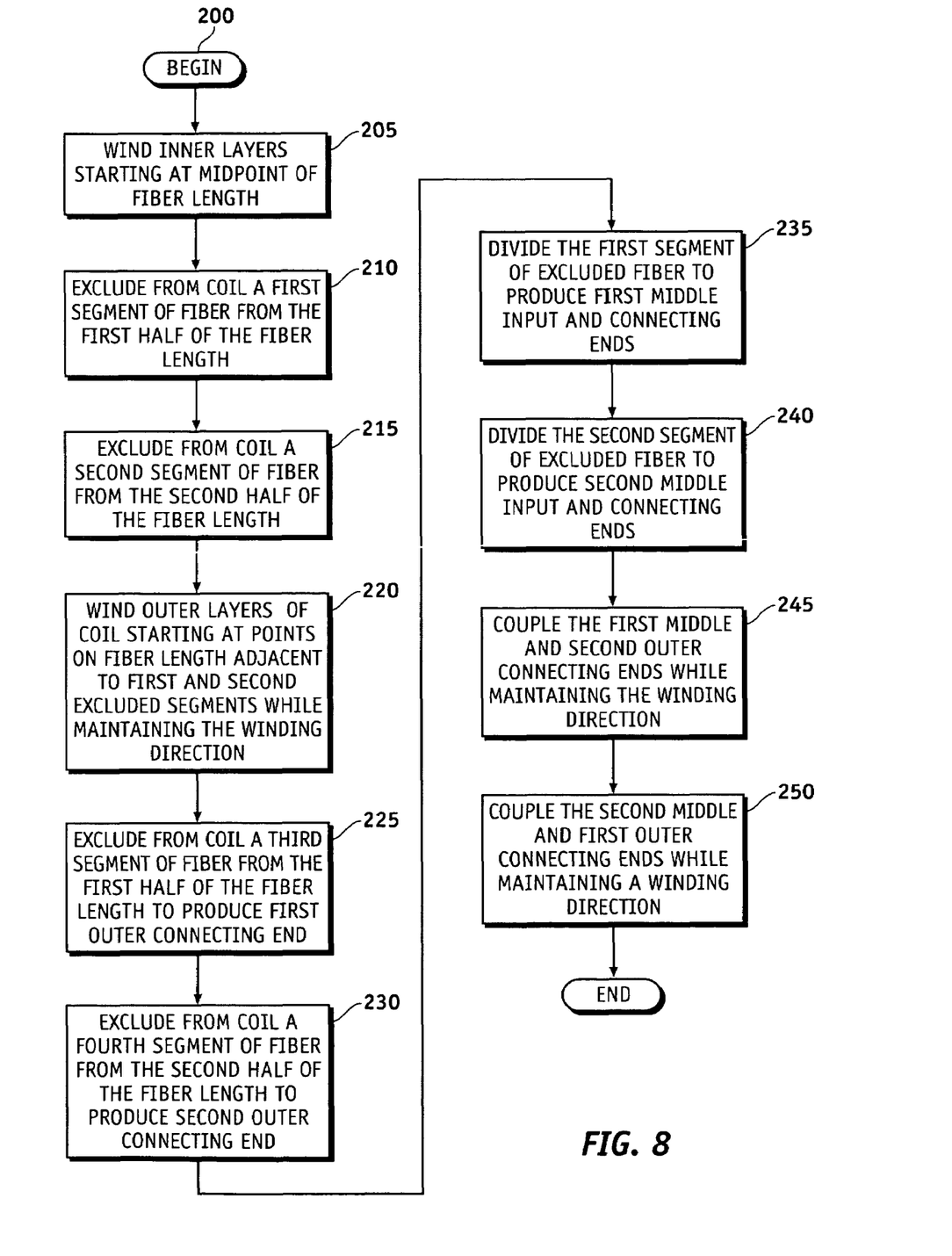
FIG. 8 is a flow diagram of a method for winding a sensing coil for a fiber optic gyroscope in accordance with another exemplary embodiment of the present invention.

FIG. 8 is a flow diagram of a method for winding a sensing coil for a fiber optic gyroscope in accordance with another exemplary embodiment of the present invention. The method begins at 200. The inner layers 14 (FIG. 1) of the sensing coil 10 (FIG. 1) are wound beginning at the midpoint of the fiber length at step 205. A first segment of optical fiber from the first half of the fiber length is excluded from the sensing coil 10 (FIG. 1) at the middle layers 16 (FIG. 1) at step 210. A second segment of optical fiber from the second half of the fiber length is excluded from the sensing coil 10 (FIG. 1) at the middle layers 16 (FIG. 1) at step 215. The outer layers 18 (FIG. 1) of the sensing coil 10 (FIG. 1) are wound beginning at points on the fiber length adjacent to the first and second excluded segments while maintaining a single winding direction at step 220. A third segment of optical fiber is excluded from the first half of the fiber length of the sensing coil 10 (FIG. 1) at the outer layers 18 (FIG. 1) to produce a first outer connecting end at step 225. A fourth segment of optical fiber is excluded from the second half of the fiber length of the sensing coil 10 (FIG. 1) at the outer layers 18 (FIG. 1) to produce a second outer connecting end at step 230.

The first segment of excluded fiber is divided to produce a first middle input and a first connecting end at step 235. The second segment of excluded fiber is divided to produce a second middle input and a second connecting end at step 240.

The first middle input and the second outer connecting end are coupled while maintaining the single winding direction at step 245. The second middle input and the first outer connecting end are coupled while maintaining the single winding direction at step 250.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A fiber optic gyroscope (FOG) sensing coil for guiding counter-propagating light beams, the FOG sensing coil comprising:
    a plurality of layers of an optical fiber having a winding direction, said plurality of layers comprising inner layers, middle layers, and outer layers, said middle layers comprising first and second input ends and first and second connecting ends, said first and second input ends configured to receive the counter-propagating light beams, said first and second connecting ends adjacent said first and second input ends, respectively, and at least one of said inner layers and outer layers comprising one or more connecting ends;
    wherein at least one of said one or more connecting ends of said inner layers, said one or more connecting ends of said outer layers, and said first and second connecting ends of said middle layers is coupled with a different one of said one or more connecting ends of said inner layers, said one or more connecting ends of said outer layers, and said first and second connecting ends of said middle layers while maintaining said winding direction.

2. A FOG sensing coil according to claim 1, wherein said first input end is diametrically opposed to said second input end.

3. A FOG sensing coil according to claim 1,
    wherein said inner layers comprises:
        a third connecting end coupled to said first connecting end; and
        a fourth connecting end adjacent to said third connecting end and coupled to said second connecting end; and
    wherein said outer layers comprises:
        a fifth connecting end; and
        a sixth connecting end coupled to said fifth connecting end.

4. A FOG sensing coil according to claim 1, wherein
    said second connecting end is coupled to said first connecting end;
    wherein said inner layers comprises:
        a third connecting end; and
        a fourth connecting end adjacent to said third connecting end; and
    wherein said outer layers comprises:
        a fifth connecting end coupled to said fourth connecting end; and
        a sixth connecting end coupled to said third connecting end.

5. A FOG sensing coil according to claim 1,
    wherein said outer layers comprises:
        a third connecting end coupled to said first connecting end; and
        a fourth connecting end adjacent to said third connecting end and coupled to said second connecting end.

6. A FOG sensing coil according to claim 1, wherein said first connecting end is prior to said first input end in said winding direction;
    said second connecting end is subsequent to said second input end in said winding direction; and
    wherein said inner layers comprises:
        a third connecting end coupled to said first connecting end; and
        a fourth connecting end adjacent to and prior to said third connecting end in said winding direction, said fourth connecting end coupled to said second connecting end; and
    wherein said outer winding comprises:
        a fifth connecting end; and
        a sixth connecting end coupled to said fifth connecting end.

7. A FOG sensing coil according to claim 1, wherein said first connecting end is prior to said first input end in said winding direction; and
    said second connecting end is adjacent to and subsequent said second input end in said winding direction, said second connecting end coupled to said first connecting end;
    wherein said inner layers comprises:
        a third connecting end; and
        a fourth connecting end adjacent to and subsequent to said third connecting end in said winding direction; and
    wherein said outer layers comprises:
        a fifth connecting end coupled to said fourth connecting end; and a sixth connecting end adjacent to and subsequent to said fifth connecting end in said winding direction, said sixth connecting end coupled to said third connecting end.

8. A FOG sensing coil according to claim 1, wherein said first connecting end is subsequent to said first input end in said winding direction; and said second connecting end is prior to said second input end in said winding direction; and wherein said outer layers comprises:
- a third connecting end coupled to said first connecting end; and
- a fourth connecting end adjacent to and subsequent to said third connecting end in said winding direction, said fourth connecting end coupled to said second connecting end.

9. A FOG sensing coil according to claim 1, wherein said first connecting end is subsequent to said first input end in said winding direction; and said second connecting end is prior to said second input end in said winding direction, said second connecting end coupled to said first connecting end;

wherein said inner layers comprises:
- a third connecting end; and
- a fourth connecting end adjacent to and subsequent to said third connecting end in said winding direction; and wherein said outer layers comprises:
- a fifth connecting end coupled to said fourth connecting end; and
- a sixth connecting end adjacent to and subsequent to said fifth connecting end in said winding direction, said sixth connecting end coupled to said third connecting end.

10. A method for winding an optical fiber to form a fiber optic gyroscope (FOG) sensing coil having a winding direction, the optical fiber having first and second connecting ends, the method comprising the steps of:
- excluding a first segment from a mid-section of the optical fiber to form a first optical fiber length and a second optical fiber length;
- winding a portion of the first optical fiber length and a portion of the second optical fiber length around an axis to form an inner layer and a middle layer surrounding the inner layer;
- excluding a second segment from the first optical fiber length forming a portion of the middle layer to produce a first input and a third connecting end therefrom;
- excluding a third segment from the second optical fiber length forming a portion of the middle layer to produce a second input and a fourth connecting end therefrom; and
- coupling each of the connecting ends with a different one of the connecting ends while maintaining the winding direction.

11. A method according to claim 10, wherein said coupling step comprises:
- coupling the first connecting end with the third connecting end; and
- coupling the second connecting end with the fourth connecting end.

12. A method according to claim 10 further comprising excluding a fourth segment from an inner layer of the sensing coil to produce fifth and sixth connecting ends.

13. A method according to claim 12, wherein said coupling step comprises:
- coupling the first connecting end with the second connecting end;
- coupling the third connecting end with the sixth connecting end; and
- coupling the fourth connecting end with the fifth connecting end.

14. A method according to claim 12, wherein said coupling step comprises:
- coupling the first connecting end with the sixth connecting end;
- coupling the second connecting end with the fifth connecting end; and
- coupling the third connecting end with the fourth connecting end.

15. A fiber optic gyroscope (FOG) sensing coil for guiding counter-propagating light beams, the FOG sensing coil comprising:
- a plurality of substantially concentric windings of an optical fiber having a winding direction, said plurality of concentric windings comprising an inner winding, a middle winding, and an outer winding, said middle winding comprising first and second input ends and first and second connecting ends, said first and second input ends configured to receive the counter-propagating light beams, said first and second connecting ends adjacent said first and second input ends, respectively, and at least one of said inner winding and outer winding comprising one or more connecting ends;
- wherein at least one of said one or more connecting ends of said inner winding, one or more connecting ends of said outer winding, and said first and second connecting ends of said middle winding is coupled with a different one of said one or more connecting ends of said inner winding, one or more connecting ends of said outer winding, and said first and second connecting ends of said middle winding while maintaining said winding direction.

16. A FOG sensing coil according to claim 15, wherein said
- first connecting end is prior said first input end in said winding direction; and
- said second connecting end is subsequent to said second input end in said winding direction;
- wherein said inner winding comprises:
  - a third connecting end coupled to said first connecting end; and
  - a fourth connecting end adjacent to and prior to said third connecting end in said winding direction, said fourth connecting end coupled to said second connecting end; and
- wherein said outer winding comprises:
  - a fifth connecting end; and
  - a sixth connecting end coupled to said fifth connecting end.

17. A FOG sensing coil according to claim 15, wherein said
- said first connecting end is prior to said first input end in said winding direction; and
- said second connecting end is subsequent to said second input end in said winding direction, said second connecting end coupled to said first connecting end;

wherein said inner winding comprises:
  a third connecting end; and
  a fourth connecting end adjacent to and subsequent to said third connecting end in said winding direction; and wherein said outer winding comprises:
  a fifth connecting end coupled to said fourth connecting end; and
  a sixth connecting end adjacent to and subsequent to said fifth connecting end in said winding direction, said sixth connecting end coupled to said third connecting end.

18. A FOG sensing coil according to claim 15, wherein said
  first connecting end is subsequent to said first input end in said winding direction; and
  said second connecting end is prior to said second input end in said winding direction; and wherein said outer winding comprises:
  a third connecting end coupled to said first connecting end; and
  a fourth connecting end adjacent to and subsequent to said third connecting end in said winding direction, said fourth connecting end coupled to said second connecting end.

19. A FOG sensing coil according to claim 15, wherein said
  first connecting end is subsequent to said first input end in said winding direction; and
  said second connecting end is prior to said second input end in said winding direction, said second connecting end coupled to said first connecting end;

wherein said inner winding comprises:
  a third connecting end; and
  a fourth connecting end adjacent to and subsequent to said third connecting end in said winding direction; and wherein said outer winding comprises:
  a fifth connecting end coupled to said fourth connecting end; and
  a sixth connecting end adjacent to and subsequent to said fifth connecting end in said winding direction, said sixth connecting end coupled to said third connecting end.

20. A FOG sensing coil according to claim 15, wherein said first and second input ends are configured to couple with an optical circuit of a FOG.

* * * * *